US011681977B2

(12) United States Patent
Blohm et al.

(10) Patent No.: US 11,681,977 B2
(45) Date of Patent: Jun. 20, 2023

(54) MAIL ITEM RETRIEVAL USING AUGMENTED REALITY

(71) Applicants: Nicole Blohm, Mount Pleasant, SC (US); Stephen Cousins, Nashville, TN (US)

(72) Inventors: Nicole Blohm, Mount Pleasant, SC (US); Stephen Cousins, Nashville, TN (US)

(73) Assignee: RICOH COMPANY, LTD., Tokyo (JP)

( * ) Notice: Subject to any disclaimer, the term of this patent is extended or adjusted under 35 U.S.C. 154(b) by 387 days.

(21) Appl. No.: 16/858,564

(22) Filed: Apr. 24, 2020

(65) Prior Publication Data

US 2021/0334749 A1 Oct. 28, 2021

(51) Int. Cl.
| | |
|---|---|
| G06Q 10/0836 | (2023.01) |
| G06Q 50/32 | (2012.01) |
| G06T 19/00 | (2011.01) |
| G06V 20/20 | (2022.01) |
| G06T 11/00 | (2006.01) |

(52) U.S. Cl.
CPC ......... *G06Q 10/0836* (2013.01); *G06Q 50/32* (2013.01); *G06T 11/00* (2013.01); *G06T 19/006* (2013.01); *G06V 20/20* (2022.01)

(58) Field of Classification Search
None
See application file for complete search history.

(56) References Cited

U.S. PATENT DOCUMENTS

| | | | |
|---|---|---|---|
| 7,201,316 B2 | 4/2007 | Anderson | |
| 8,046,308 B2 | 10/2011 | Miette | |
| 8,110,052 B2 | 2/2012 | Olsen | |
| 10,346,891 B2 | 7/2019 | Amato | |
| 10,366,299 B2 | 7/2019 | Bowne | |
| 10,369,597 B2* | 8/2019 | Farlotti | B07C 3/003 |
| 2001/0032805 A1 | 10/2001 | Lawandy | |
| 2003/0154219 A1 | 8/2003 | Yoshihara et al. | |
| 2004/0182925 A1* | 9/2004 | Anderson | B07C 3/20 340/572.1 |
| 2005/0141006 A1 | 6/2005 | Aiyama | |
| 2005/0190402 A1 | 9/2005 | Nakamura | |
| 2005/0195430 A1 | 9/2005 | Shinohara et al. | |

(Continued)

OTHER PUBLICATIONS

Blohm, U.S. Appl. No. 16/355,430, filed Mar. 15, 2019, Notice of Allowance and Fees Due, dated Jun. 10, 2022.

*Primary Examiner* — Edward Martello
(74) *Attorney, Agent, or Firm* — Hickman Becker Bingham Ledesma LLP

(57) ABSTRACT

An approach is provided for retrieving physical mail items using Augmented Reality (A/R) technology. According to the approach, mail items are stored in a designated area of a mail item facility and users are notified that the mail items are available for pickup. The users are guided to the locations of their respective mail items in the mail item facility via A/R technology. This includes superimposing visual cues on a live image displayed on a mobile computing device to direct the users to locations of their mail items. Embodiments include dynamically updating the visual cues based upon the location and orientation of the mobile computing device, providing "out of view" assistance, and displaying information about mail items.

20 Claims, 12 Drawing Sheets

(56) References Cited

U.S. PATENT DOCUMENTS

| | | |
|---|---|---|
| 2006/0092462 A1 | 5/2006 | Mokuya |
| 2006/0253406 A1 | 11/2006 | Caillon |
| 2007/0214363 A1 | 9/2007 | Ishii |
| 2007/0273702 A1 | 11/2007 | Ishii |
| 2009/0141934 A1 | 6/2009 | Caillon |
| 2010/0032805 A1 | 2/2010 | Letertre et al. |
| 2010/0040256 A1 | 2/2010 | Rundle |
| 2011/0199478 A1 | 8/2011 | Ito |
| 2015/0076043 A1 | 3/2015 | Serjeantson |
| 2015/0110343 A1* | 4/2015 | Worth, II ............... G06V 10/17 382/101 |
| 2016/0371638 A1* | 12/2016 | Loverich ............... G06Q 10/08 |
| 2018/0029083 A1 | 2/2018 | Farlotti |
| 2020/0290089 A1 | 9/2020 | Blohm |

\* cited by examiner

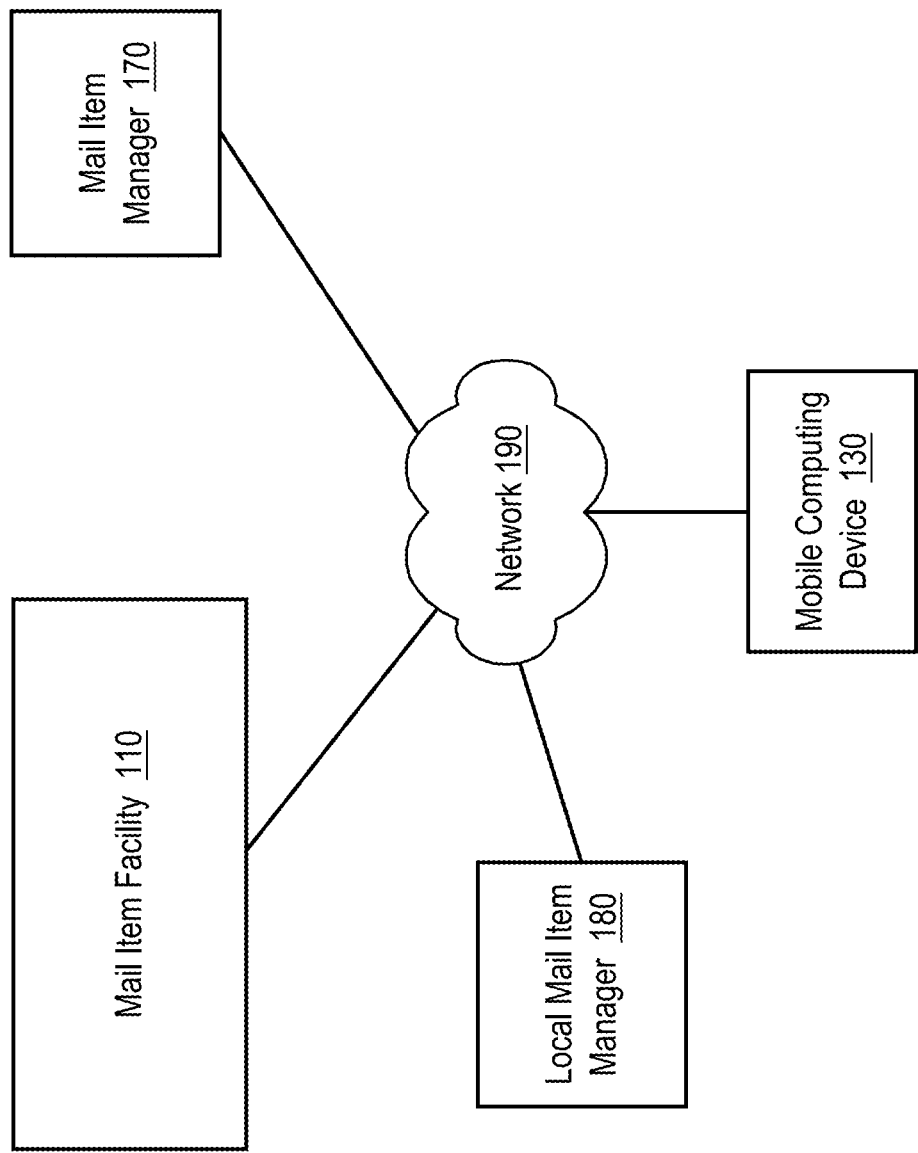

FIG. 1E

Mail Item Management Data 176

| Mail Item ID | User ID | Location | Received Date/Time | Pickup Date/Time | Status | Picked Up By |
|---|---|---|---|---|---|---|
| ID1 | User 1 | Loc171 | T10 | T22 | Retrieved | User 1 |
| ID2 | User 2 | Loc119 | T23 | | Ready for pickup | |
| ID3 | User 1 | Loc157 | T24 | | Ready for pickup | |
| ID4 | User 1 | Loc157 | T25 | | Ready for pickup | |
| ID5 | User 2 | Loc125 | T30 | T40 | Retrieved | User 2 |
| ID6 | User 2 | Loc125 | T35 | T40 | Retrieved | User 2 |
| ID7 | User 1 | Loc228 | T18 | T27 | Retrieved | User 9 |
| ID8 | User 1 | Sort2 | T41 | | Received | |
| ID9 | User 1 | Loc1 | T1 | T2 | Ready for pickup | |
| ID10 | User 3 | Loc189 | T52 | | Ready for pickup | |
| ID11 | User 3 | Loc195 | T57 | | Ready for pickup | |
| ID12 | User 2 | Sort 1 | T61 | | Received | |

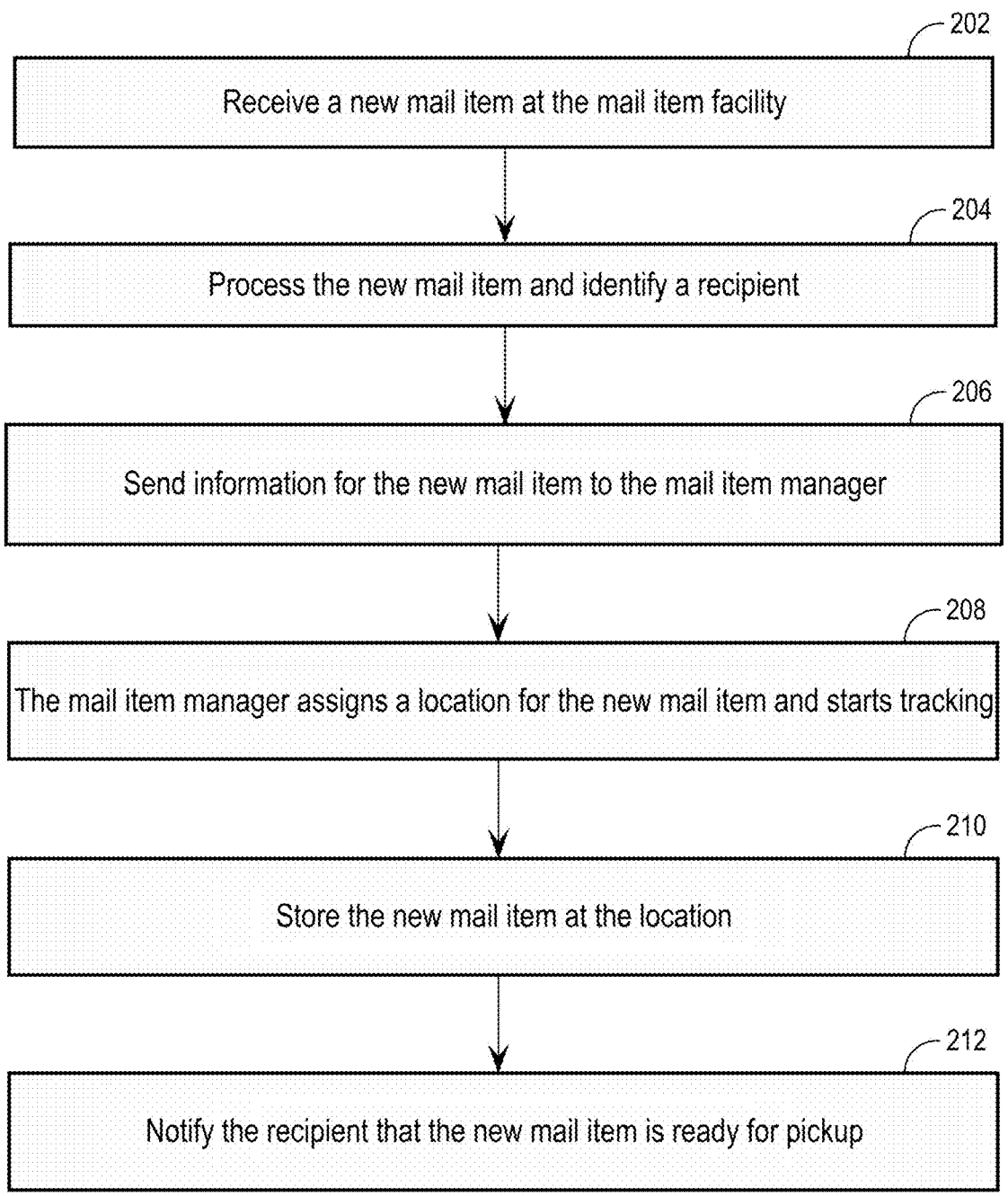

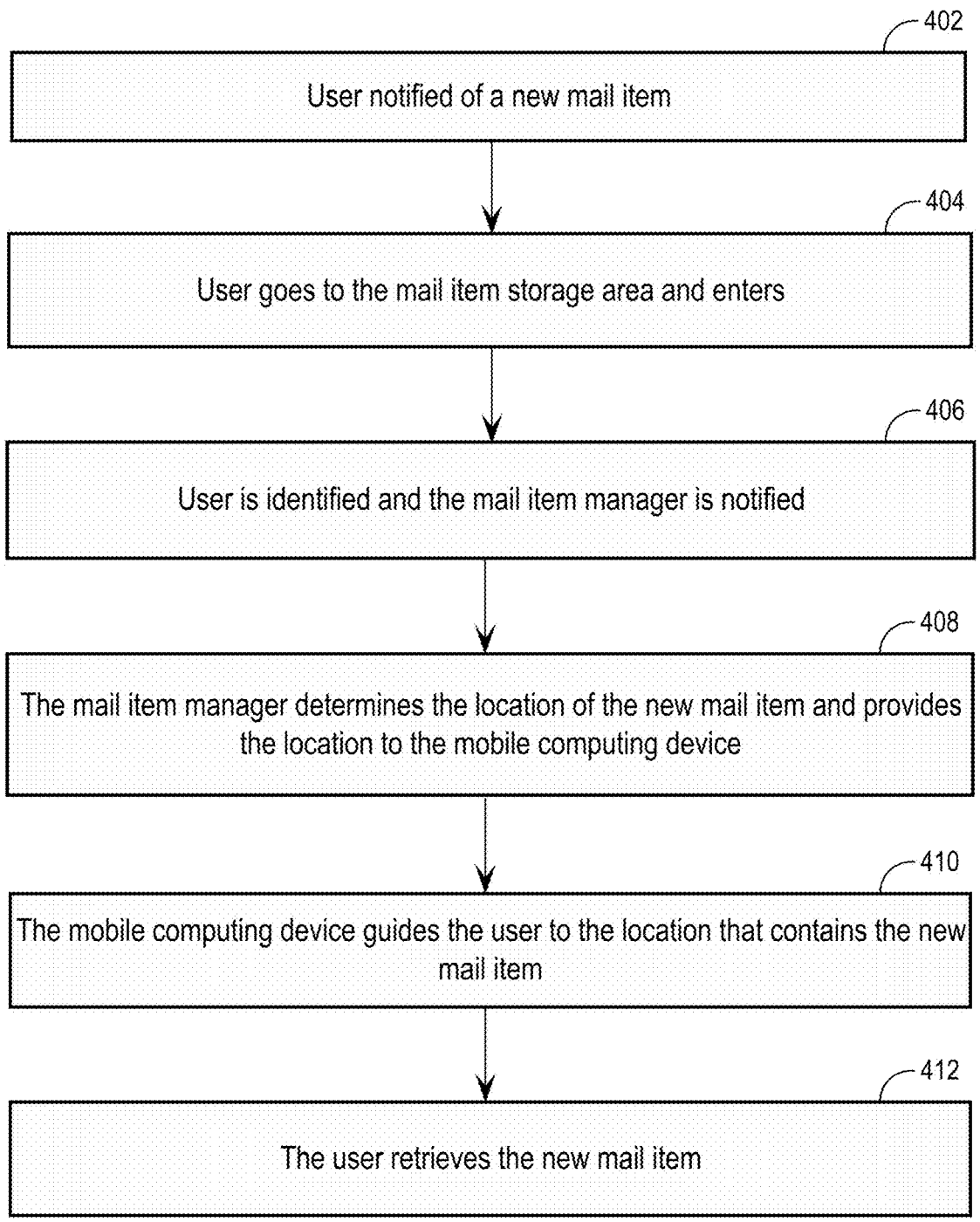

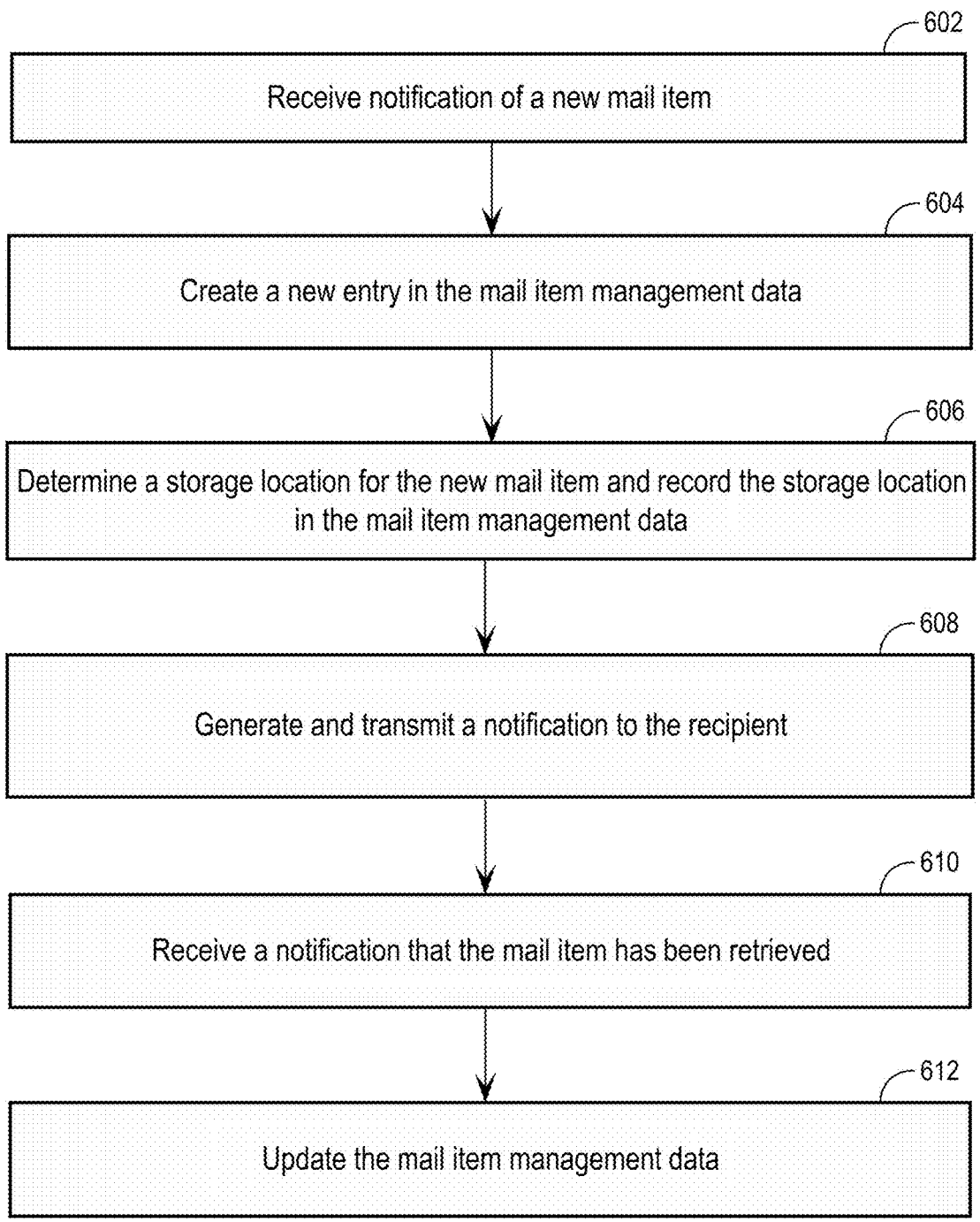

MAIL ITEM RETRIEVAL USING AUGMENTED REALITY

RELATED APPLICATION DATA AND CLAIM OF PRIORITY

This application is related to U.S. patent application Ser. No. 16/355,430 entitled "TRACKING AND MANAGING MAIL ITEMS USING IMAGE RECOGNITION", filed Mar. 15, 2019, and U.S. patent application Ser. No. 16/355,421 entitled "DETERMINING THE POSITION OF A SORT LOCATION FOR AUGMENTED REALITY GLASSES", filed Mar. 15, 2019 and U.S. patent application Ser. No. 16/355,426 entitled "A MAIL ITEM MANAGER FOR SORTING MAIL ITEMS USING AUGMENTED REALITY GLASSES", filed Mar. 15, 2019, the contents all of which are incorporated by reference in their entirety for all purposes as if fully set forth herein.

FIELD

The technical field of the present disclosure relates to improved methods, systems, computer software, and/or computer hardware in the field of retrieving physical mail items.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

One conventional approach for delivering mail items in office environments is to physically deliver mail items to recipients at their respective locations within the office. For example, mail personnel of a business organization often deliver mail items to recipients at their in-boxes, cubicles, offices, etc. While commonplace and convenient for recipients, this approach is labor intensive because mail personnel need to stop at every location to pickup outbound mail items. Also, delivery typically occurs only once per day, meaning that mail items not delivered by a cutoff time are not delivered until the next day. This approach also lacks tracking and accountability because recipients are not required to acknowledge actual receipt.

Another approach for delivering mail items in office environments uses mail lockers. Mail lockers sometimes also referred to as "parcel lockers," are centralized groups of physical compartments into which mail items are stored for pickup by recipients. Some mail locker systems automatically notify a recipient, for example via email, when a mail item is ready for pickup and identify the particular mail locker that contains their mail item. The recipient walks to the mail lockers and retrieves their mail item from the particular mail locker specified in the email. In environments where security is needed, the mail lockers are lockable, and the email specifies a code that the user enters into a keypad to unlock the particular mail locker. While mail lockers offer some improvements over the conventional mail delivery approach previously described herein, such as being less labor intensive and allowing mail item pickup at any time, mail lockers are expensive to implement, are of a fixed size, and are not easily relocated.

SUMMARY

A mobile computing device comprises a display, an image acquisition component, and an application executing on the computing device. The application is configured to cause the image acquisition component to acquire an image of a physical mail item pickup area and cause the image of the physical mail item pickup area to be displayed on the display of the mobile computing device. The application is further configured to cause to be superimposed on the image of the physical mail item pickup area, one or more visual cues that direct a user of the mobile computing device to a location of a physical mail item for the user.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

FIG. 1A is a block diagram that depicts an arrangement for retrieving mail items using augmented reality technology.

FIG. 1E depicts an example of mail item management data.

FIG. 2 is a flow diagram that depicts an approach for receiving and storing mail items.

FIG. 4 is a flow diagram that depicts an approach for retrieving mail items using a mobile computing device and augmented reality.

FIG. 6 is a flow diagram that depicts an approach for retrieving a mail item using a mobile computing device and augmented reality from the perspective of the mail item manager.

DETAILED DESCRIPTION

Figure 1B:
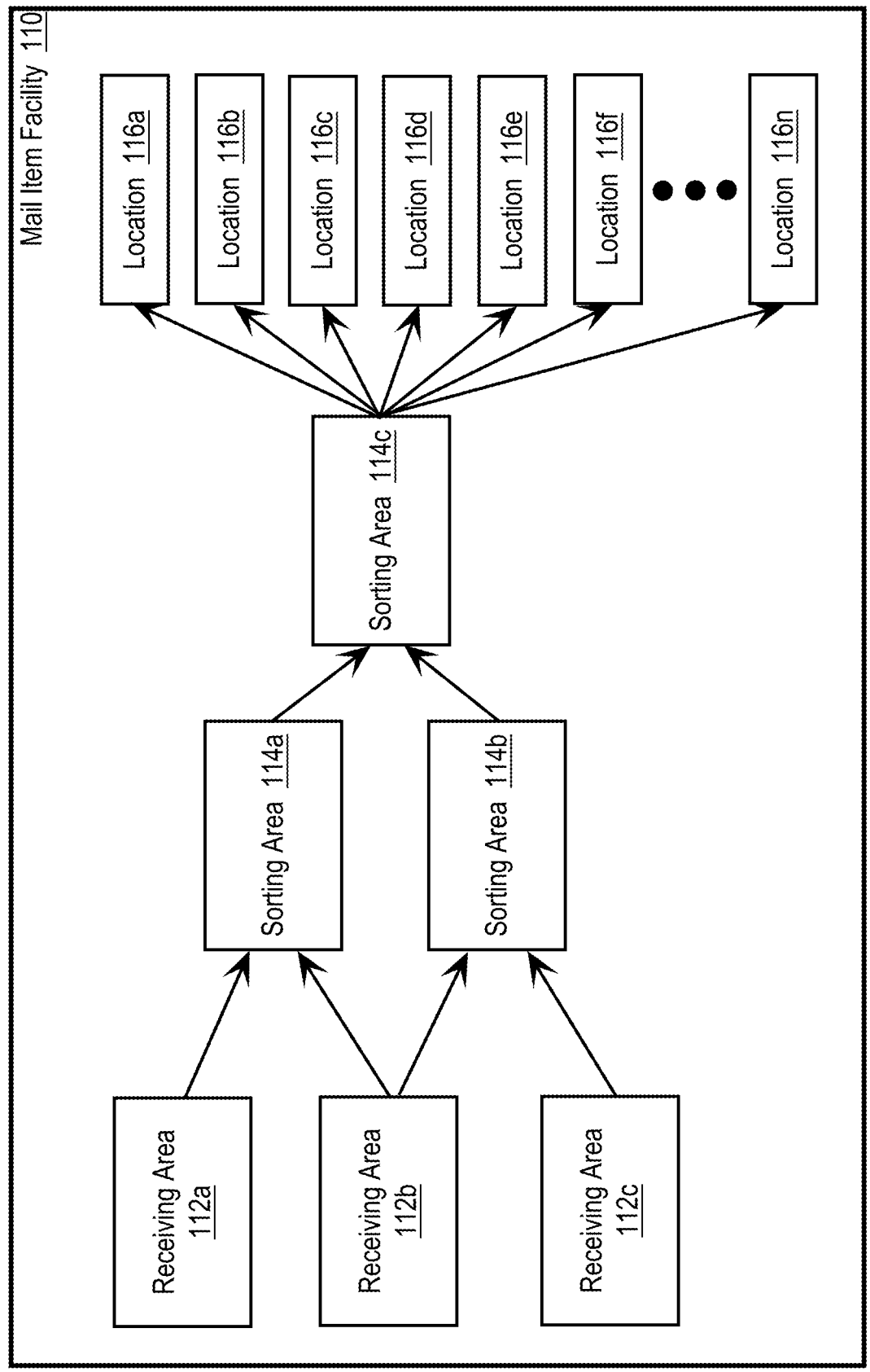
FIG. 1B is a block diagram that depicts an example implementation of a mail item facility.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Mail Item Retrieval Architecture
A. Mail Item Facility
B. Mobile Computing Device
C. Mail Item Manager
III. Mail Item Processing
A. Overview
B. Storing New Mail Items
C. Retrieving New Mail Items
IV. Implementation Examples

I. OVERVIEW

An approach is provided for retrieving physical mail items using Augmented Reality (A/R) technology. According to the approach, mail items are stored in a designated area of a mail item facility and the recipients of the mail items are notified that the mail items are available for pickup. The recipients are guided to the locations of their respective mail items in the mail item facility via A/R technology. This includes superimposing visual cues on a live image displayed on a mobile computing device to direct the recipients to locations of their mail items. Embodiments include dynamically updating the visual cues based upon the location and orientation of the mobile computing device, providing "out of view" assistance, and displaying information about mail items. As used herein, the terms "physical mail item" and "mail item" refer to any physical item that may be mailed. Examples include, without limitation, cards, envelopes, packages, parcels, items of commerce, etc.

This approach provides a more favorable user experience than conventional mail item delivery methods by grouping multiple mail items regardless of receipt time and allowing users to retrieve mail items at their convenience. The approach also relieves mail personnel from having to visit every location in an office to collect outbound mail items.

II. MAIL ITEM RETRIEVAL ARCHITECTURE

FIG. 1A is a block diagram that depicts an arrangement 100 for retrieving mail items using A/R technology. The arrangement 100 includes a mail item facility 110, a mobile computing device 130, a mail item manager 170, and a local mail item manager 180, communicatively coupled via a network 190. Although network 190 is depicted and described herein in the context of a single network, network 190 may be implemented by any number of wireless and/or wired computer networks of any type. In addition, the elements depicted in FIG. 1A may have direct communications links. Embodiments are not limited to the arrangement 100 having the specific elements depicted in the figures and described herein and may have additional elements, fewer elements, and/or different elements, depending upon the implementation.

A. Mail Item Facility

The mail item facility 110 is a physical location at which mail items are received, sorted, and stored for pickup. Mail item facility 110 is not limited to any particular implementation and examples of mail item facility 110 include, without limitation, a mail department within a business enterprise, organization, private mail entity, government mail entity, etc., a warehouse, shipping facility, etc. Embodiments are described herein in the context of a single mail item facility 110 for purposes of explanation, but embodiments are not limited to a single mail item facility 110 and implementations may include any number and types of mail item facilities 110.

FIG. 1B is a block diagram that depicts an example implementation of the mail item facility 110. Mail items are received at receiving areas 112a, 112b, 112c, which may represent physical areas, such as a mail receiving portal, mail receiving boxes or doors, a department or area, etc., of a business enterprise, organization, etc., for receiving mail items. Mail items may be processed at the receiving areas 112a, 112b, 112c, for example, by printing and applying a label, RFID tag, etc., to the mail items to allow the mail items to be tracked and managed within the mail item facility 110 and elsewhere. Alternatively, mail items may be tracked using labels, codes, etc., applied by the delivery company, e.g., United Parcel Service (UPS), FedEx, Amazon, the United States Postal Service (USPS), etc. The mail items are then routed to sorting areas 114a, 114b, which are physical areas for sorting mail items, and may represent a mail sorting area and/or equipment within an organization. The mail items are sorted at sorting area 114a, 114b and supplied to sorting area 114c, which is also a physical area for sorting mail items. The sorting areas 114a, 114b may represent a first level of sorting within an organization and the sorting area 114c may represent a second level of sorting within the organization. Embodiments are not limited to the example depicted in FIG. 1B and are applicable to any number and type of sorting levels and implementations with no dedicated sorting areas.

The mail items are moved to locations 116a-116n for pickup by the recipients. Locations 116a-116n are physical locations such as mailboxes, bins, shelves, mail lockers, etc. The sorting areas 114, 114, 114c are optional and the mail items may be moved from the receiving areas 112a, 112b, 112c without intermediate sorting. The mail item facility 110 may also include a mail item drop off area for outbound mail items.

B. Mobile Computing Device

The mobile computing device 130 uses A/R to guide a user to their mail items stored in the locations 116a-116n. This may include superimposing visual cues on a live image displayed on a mobile computing device, as described in more detail hereinafter. Example implementations of the mobile computing device 130 include, without limitation, a smart phone, a tablet computing device, a personal digital assistant, a laptop computer, and a wearable A/R device, such as A/R glasses. Although embodiments are depicted in the figures and described herein in the context of a single mobile computing device 130, this is done for explanation purposes only and embodiments are applicable to any number of mobile computing devices. For example, a large receiving and sorting facility for mail items may include a large number of mobile computing devices.

Figure 1C:
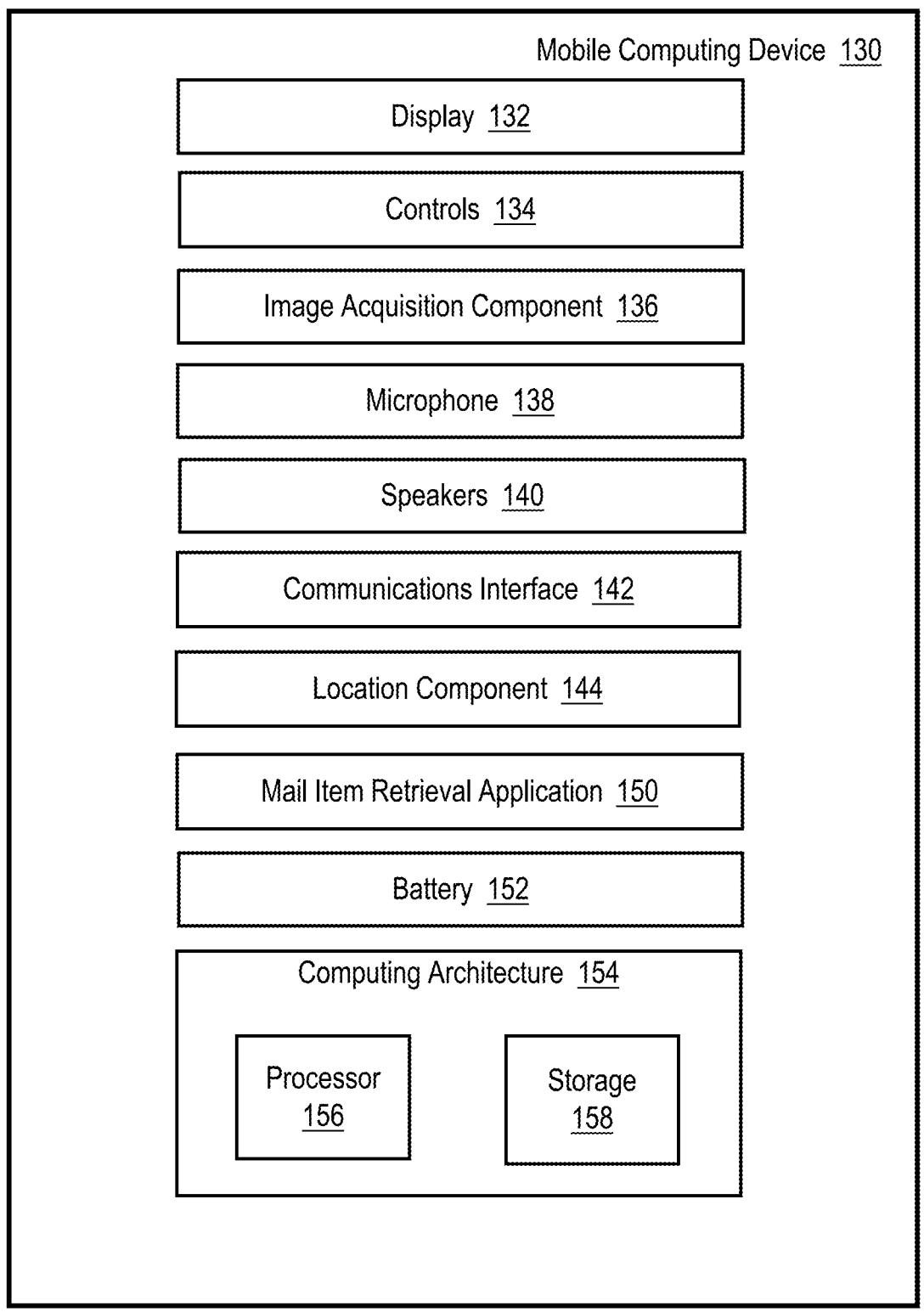
FIG. 1C depicts an example embodiment of a mobile computing device.

FIG. 1C depicts an example embodiment of the mobile computing device 130 and includes a display 132, controls 134, an image acquisition component 136, a microphone 138, speakers 140, a communications interface 142, a location component 144, a mail item retrieval application 150, a battery 152, and a computing architecture 154. Embodiments of the mobile computing device 130 are not limited to the example depicted in FIG. 1C and the mobile computing device 130 may have fewer elements or additional elements, depending upon a particular implementation.

The display 132 allows the mobile computing device 130 to display information to a user. The display 132 may be implemented in the form of eyeglass lenses, one or more displays or screens, etc. The display 132 is configured to display text and/or images in black and white and/or color. The display 132 may also be a touch screen that is configured to accept user input.

The controls 134 allow a user to provide user input to the mobile computing device 130 and may include, for example, physical controls such as buttons, sliders, etc., and soft controls, such as graphical user interface objects, displayed on the display 132. Embodiments may also include remote controls. For example, a physical controller, external touchscreen, or other device may include physical or soft controls that allow a user to provide input to the mobile computing device 130. These devices may communicate with the mobile computing device 130 via a wired or wireless connection.

The image acquisition component 136 acquires images and/or video data and generates image and/or video data that represents the images and/or video. The image acquisition component 136 may include, for example, one or more cameras and associated computer hardware and/or computer software or firmware.

The microphone 138 receives audio input from a user and converts the audio input into electronic signals. According to an embodiment, the mobile computing device 130 supports voice recognition and recognizes spoken commands for controlling the mobile computing device 130. The speakers 140 convert audio signals into audio output for users. The communications interface 142 allows the mobile computing device 130 to communicate with other devices over the network 190 and may be implemented by one or more wireless and/or wired computer communications interfaces to support communications via Bluetooth, WiFi, WiGig, Near Field Communication (NFC), etc. The location component 144 is an element that determines a current location of the mobile computing device 130 and may be implemented by one or more position sensors, such as GPS sensors, proximity sensors, etc.

The mail item retrieval application 150 manages the various elements on the mobile computing device 130 to assist users in retrieving mail items. This includes visually guiding users to locations of their mail items during mail item retrieval. According to an embodiment, the mail item retrieval application 150 causes the image acquisition component 136 to acquire a live image, for example of an area in front of the mobile computing device 130, and augment the image by superimposing visual cues to direct the recipients to locations of their mail items. The visual cues may include a wide variety of visual elements that may vary depending upon a particular implementation. Examples of visual cues include, without limitation, polygons, such as rectangles to highlight a particular area, highlighting, shading, direction arrows, special popups, including biohazard or fragile alerts, etc. As described in more detail hereinafter, the mail item retrieval application 150 also interacts with the mail item management application 170, and other systems, to identify users, obtain locations of mail items, and update the status of mail items during and after retrieval.

The mail item retrieval application 150 may provide a graphical user interface with controls that allows a user to initiate these functions. For example, the graphical user interface may include a control that allows a user to retrieve their mail items. The mail item retrieval application 150 may also be configured to perform these functions in response to a signal that is generated when a user enters the mail item facility 110.

The battery 152 provides electrical power to the mobile computing device 130 and may include any number of batteries of any type. The computing architecture 154 includes a processor 156 and storage 158 and supports the execution of computing processes and the storage of data on the mobile computing device 130. The processor 156 may be one or more computer processors that are capable of executing instructions stored in the storage 158. The storage 158 may be implemented by volatile storage, non-volatile storage, or any combination of volatile and non-volatile storage.

C. Mail Item Manager

Figure 1D:
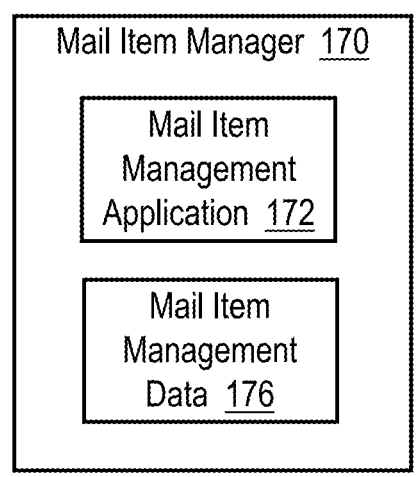
FIG. 1D is a block diagram that depicts an example of a mail item manager.

The mail item manager 170 is an entity that manages information for mail items and provides location and other information about mail items to the mobile computing device 130 to assist users in retrieving mail items. FIG. 1D is a block diagram that depicts an example embodiment of the mail item manager 170 and includes a mail item management application 172, also referred to herein as a mail item management process, and mail item management data 176. The mail item manager 170 may include other elements that may vary depending upon a particular implementation. For example, the mail item manager 170 may include one or more processors, one or more memories, one or more communications interfaces, etc., that are not depicted in FIG. 1D for purposes of explanation.

The mail item management application 172 may be implemented by one or more processes for providing information to the mobile computing device 130 to assist in retrieving mail items, as described in more detail hereinafter. The mail item management application 172 may support an API that provides access to functionality of the mail item management application 172. For example, the API may support commands that may be used by the mobile computing device 130 to request information for mail items and to provide information to the mail item management application 172, such as status information, etc., as described in more detail hereinafter. The API may also provide access to information stored and managed by the mail item management application 172.

The mail item management data 176 is data used by the mail item management application 172 to manage mail items and more specifically to track mail items and to retrieve mail items using the mobile computing device 130 as described herein. FIG. 1E depicts an example embodiment of the mail item management data 176 in the form of a table, where each row of the table corresponds to a mail item and includes a mail item ID, a User ID, a location, a received date/time, a pickup date/time, a status, and a picked up by field. Not all of these values are required, and embodiments are applicable to fewer or additional values that may vary depending upon a particular implementation. As one example, the mail item management data 176 may include image data, or a link to image data, for each mail item.

The mail item ID is data that uniquely identifies a mail item and provides tracking and accountability that can be used to comply with certain requirements, such as regulatory and legal requirements, etc. Examples of mail item IDs include, without limitation, numbers, alphanumeric strings, etc. Mail item IDs may be generated by the mail item management application 172 and assigned to mail items as the mail items are received in the mail item facility 110. For example, mail item IDs may be generated when mail items are received at the receiving areas 112a-112c. Mail item IDs may be physically associated with mail items, for example, via marking or labels. For example, when a mail item is received in one of the receiving areas 112a-112c, a mail item ID is generated for the mail item and printed on a label that is affixed to the mail item or directly marked on the mail item. The mail item management application 172 may generate mail item IDs in a variety of ways, for example, by random generation, based upon third-party information such as courier or fulfillment information, or based upon physical characteristics of mail items. For example, a mail item ID may be a hash value generated from an image of a mail item. The image may be of the entire mail item, or a portion of the mail item, such as a side of the mail item that includes sender and recipient information. As another alternative, existing codes, such as barcodes or QR codes, or other unique forms of mail item IDs on a mail item may be used as the mail item ID for a mail item so that an additional mail item ID does not need to be generated for the mail item.

The user ID is data that uniquely identifies a user, such as a number or alphanumeric string. The location is data that identifies a location of the mail item, such as the name or identifier of a storage location within the mail item facility 110, GPS coordinates, etc. The received date/time is a date and/or time at which the mail item was received by the mail item facility 110. The received date/time may include multiple dates and/or times that specify when the mail item was first received by the mail item facility 110 and other locations within the mail item facility 110, such as the sort areas 114a-114c and the locations 116a-116n. The pickup date/time is a date and/or time at which the mail item is retrieved from the location. The status is data that indicates a current status of the mail item and may be, for example, a number, alphanumeric string, etc. Embodiments are depicted in the figures in the context of alphanumeric strings, such as "Received," "Ready for pickup," and "Retrieved," although embodiments are not limited to these examples. The status may include other information, for example, a time at which a mail item was retrieved. The picked up by field is data that specifies a user who picked up the mail item and may also include a time that a mail item was retrieved. As described in more detail hereinafter, users may delegate the authority to pick up a mail item to other users.

The mail item management application 172 may support an API that the mobile computing device 130 and other client devices use to communicate with, and invoke functionality on, the mail item management application 172. For example, the API allows the mobile computing device 130 to send a user ID to the mail item management application 172 and receive information that identifies mail items that are ready to be picked up by the user and the location(s) of the mail items. The API also allows the mobile computing device 130 to confirm to the mail item management application 172 that a mail item has been retrieved, the time of retrieval, and the user that retrieved the mail item. The API may also allow a client device to access the mail item management data 176. For example, the API may provide access to a graphical user interface, such as a Web-based graphical user interface, that allows a user to view and manage the mail item management data 176.

The mail item manager 170 may manage any number mail item facilities, for example mail item facilities at different physical locations. The mail item manager 170 may maintain separate mail item management data 176 for each mail item facility or may maintain aggregated mail item management data 176 for all mail item facilities, depending upon a particular implementation.

According to an embodiment, the arrangement 100 includes a local mail item manager 180 that is disposed within or nearby the mail item facility 110. The local mail item manager 180 may include the same elements as the mail item manager 170 and implement the approach described herein in situations where communications are not possible with the mail item manager 170, for example, because of a failure on the network 190. The local mail item manager 180 may also be used instead of the mail item manager 170 for other reasons, for example, because of high loading on the mail item manager 170. In addition, the local mail item manager 180 may have data that is specific to a particular implementation that the mail item manager 170 does not have. For example, there may be changes in sort locations, local policies, security concerns, etc., that are known to, and reflected in the data maintained by the local mail item manager 180 that are not known to the mail item manager 170.

III. MAIL ITEM PROCESSING

A. Overview

An improvement in mail item retrieval is provided by a mobile computing device that uses A/R to guide users to their respective mail items for retrieval. According to an embodiment, this includes superimposing visual cues on a live image displayed by the mobile computing device to direct the recipients to locations of their mail items.

B. Storing New Mail Items

Mail items received at the receiving areas 112a-112c of the mail item facility 110 are optionally sorted in the sorting areas 114a-114c and then stored in the locations 116a-116n. This process includes notifying the mail item manager 170 of the received mail items so that the mail item management application 172 can assign a location, including grouping items for the same recipient, track the mail items and notify the recipient that the mail items are available for retrieval.

FIG. 2 is a flow diagram 200 that depicts an approach for receiving and storing mail items. In step 202, a mail item is received at the mail item facility. For example, a new mail item is received at one of the receiving areas 112a-112c of the mail item facility 110. The new mail item may originate from outside a business organization in which the mail item facility is located, or from inside the business organization, e.g., for internal mail item transfers.

In step 204, the new mail item is processed, and the recipient is identified. For example, the mail item facility 110 may include equipment, such as scanners, image capture equipment, etc., for determining information about the new mail item, such as the carrier, the sender, the recipient, dimensions, weight, contents, special handling requirements, etc., of the new mail item from information printed on the mail item or attached to the mail item, e.g., via a label, tag, codes, such as bar codes and QR codes, etc.

In step 206, the information for the new mail item is sent to the mail item manager. For example, the receiving areas 112a-112c may include equipment and computer systems to generate and transmit a new mail item notification to the mail item management application 172 to inform the mail item management application 172 that the new mail item has been received. The new mail item notification may include any information about the new mail item, such as the recipient, e.g., by name or code, data that identifies the new mail item, a date/time at which the new mail item was received by the mail item facility 110 and/or other information about the new mail item, such as sender information, physical dimensions, weight, etc.

In step 208, the mail item manager assigns a location for the new mail item and starts tracking. For example, the mail item management application 172 creates a new entry for the new mail item in the mail item management data 176 and populates the data in the new entry. According to an embodiment, the mail item management application 172 determines whether the mail item management data 176 includes one or more other entries for the same recipient for which the corresponding mail item has not yet been retrieved and if so, uses the location specified in those entries for the new mail item. This may include verifying that the location will accommodate the existing mail items and the new mail item, for example, based upon the dimensions of the new mail item. In situations where the location will not accommodate the new mail item, the mail item management application 172 selects a location close to the current locations so that all the mail items for the recipient are grouped together. The mail item management application 172 also notifies the equipment and/or computer systems at the receiving areas 112a-112c of the location for the new mail item so that it can be properly routed.

In step 210, the new mail item is stored at its assigned location, which may involve sorting areas 114a-114c sorting and routing the new mail item to its assigned location in locations 116a-116n. As described above, new mail items are stored with, or in close proximity, to other mail items for the same recipient so that the mail items are grouped together. This allows the recipient to perform a single action, such as scan a single code, e.g., a bar code, QR code, etc., when the mail items are retrieved.

In step 212, the recipient is notified that the new mail item is ready for pickup. This may include the mail item management application 172 generating and transmitting a notification to the recipient that they have a new mail item that is ready for pickup. The notification may include information about the new mail item, such as sender information, when the new mail item was received, a description of the new mail item, dimension information for the new mail item, and the location where the new mail item is stored.

C. Retrieving New Mail Items

Figure 3:
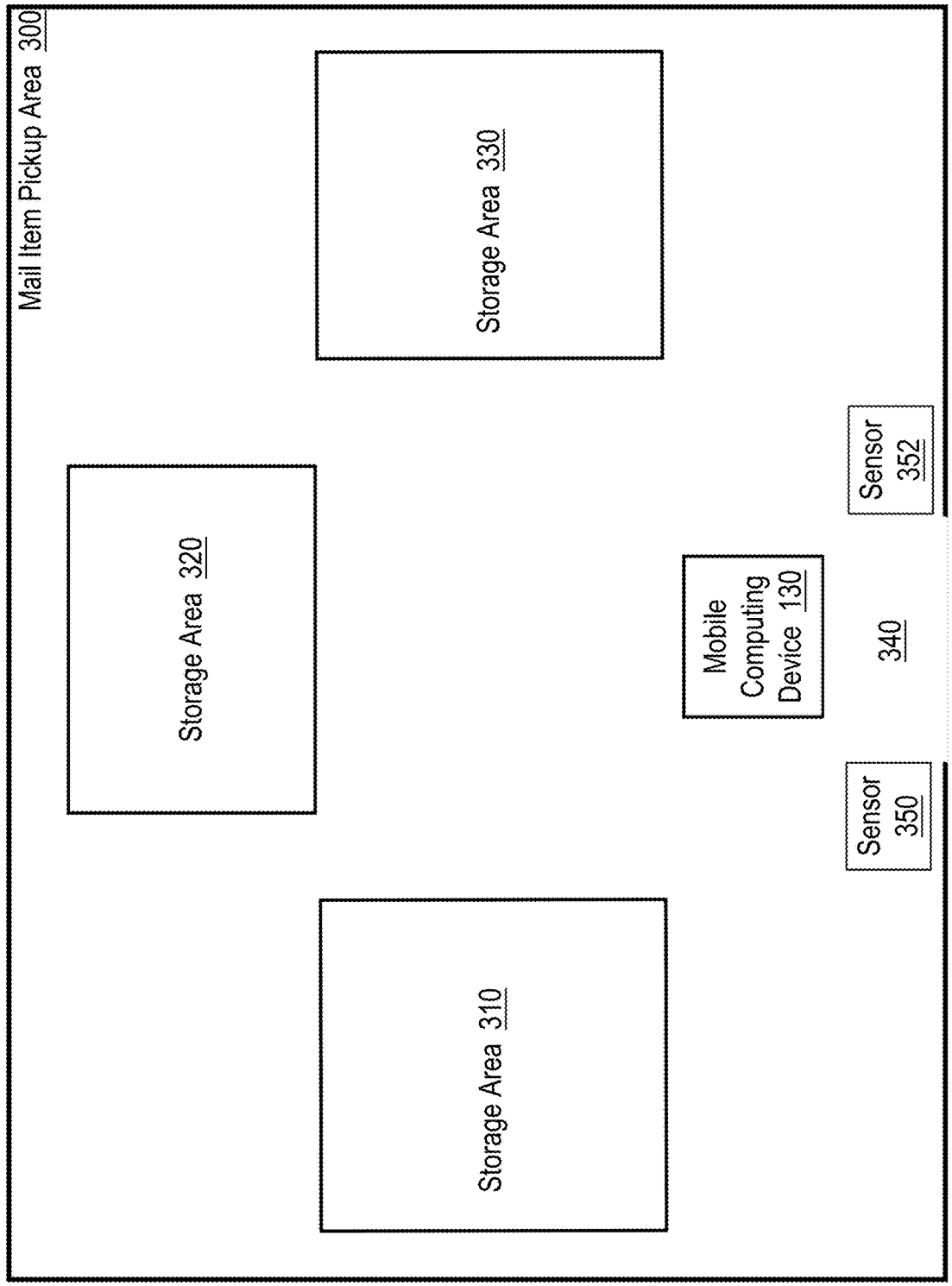
FIG. 3 is a block diagram that depicts a mail item pickup area that stores mail items that are ready for pickup by their respective recipients.

FIG. 3 is a block diagram that depicts a mail item pickup area 300 that stores mail items that are ready for pickup by their respective recipients. According to an embodiment, the mail item pickup area 300 is disposed in a mail item facility, such as the mail item facility 110. In the example depicted in FIG. 3, the mail item pickup area 300 includes storage areas 310, 320, 330 that store mail items received by the mail item facility. The storage areas 310, 320, 330 each may include the capability to store multiple mail items of any size and type and may include physical structures such as racks, shelves, mail slots, floor space for larger mail items, etc.

An entrance area 340 provides access to the mail item pickup area 300 and may include features and/or structures, such as a door, gate, etc. The mail item pickup area 300 includes sensors 350, 352 that are configured to detect the presence of and identify users in the entrance area 340. The sensors 350, 352 may include any types and number of sensors that may vary depending upon a particular implementation. Examples of sensors 350, 352 include, without limitation, video cameras, proximity sensors, RFID sensors, scanners, card readers, etc. For example, the sensors 350, 352 may include motion detectors that trigger the capture of video when motion is detected in the entrance area 340. Users may also be tracked within the mail item pickup area 300 and/or identified using geo-location tracking of the mobile computing device 130.

FIG. 4 is a flow diagram 400 that depicts an approach for retrieving mail items using a mobile computing device and A/R. In step 402, the user is notified of a new mail item that is ready to be retrieved. For example, the mail item retrieval application may receive a notification, such as a message, instant message, email, etc., from the mail item management application 172 indicating that the user has a new mail item and in response to the message, notify the user via the mail item retrieval application 150. The notification may specify information about new mail item, such as a description, sender information, a time that the new mail item was received by the mail item facility 110, weight, dimensions, etc. The user may receive the notification via the mobile computing device 130 or another computing device.

According to an embodiment, users may delegate retrieval of mail items to other users. The notification that the recipient receives may include a control which, when selected, allows the recipient to specify a delegee, e.g., via an email address. The notification is forwarded to the delegee and the mail item management application 172 is notified and updates the mail item management data 176 with the delegee's information. The delegee is then permitted to retrieve the new mail item on behalf of the recipient, in the same manner as the recipient described hereinafter. According to an embodiment, the recipient may specify, at the time of delegation, whether the recipient should receive a notification when the mail item is retrieved by the delegee. For example, the notification that the recipient receives from the mail item management application 172 may include a control which, when selected, causes a confirmation notification to be generated and transmitted to the recipient when the mail item is retrieved by the delegee. Alternatively, delegation may be implemented using Artificial Intelligence (AI) and a customer database to automatically route a recipient's notification to a designated resource without the recipient needing to take further action.

In step 404, the user goes to the mail item storage area and enters. For example, the user goes to the mail item pickup area 300 and enters the entrance area 340 with the mobile computing device 130 and activates the mail item retrieval application 150, for example by selecting a corresponding icon displayed on the display 132 of the mobile computing device 130. Embodiments are not limited to users using their own mobile computing device and users may use a mobile computing device provided at the mail item pickup area 300 that is available for any user to use. For example, several A/R glasses or smart phones may be provided at the mail item pickup area for anyone to use.

In step 406, the user is identified, and the mail item manager is notified. For example, when the user enters the entrance area 340, the sensors 350, 352 collect sensor data and transmit the sensor data to a system, such as a security system, for analysis. There are many different approaches for identifying the user and embodiments are not limited to any particular approach. As one example, the user may present an identification card to the sensors 350, 352 and information from the identification card is transmitted to the security system. The security system uses the information to identify the user, e.g., by using the information to perform a lookup of the user in a database. As another example, the sensors 350, 352 may include a fingerprint scanner or a face recognition scanner, the user provides a fingerprint or a face scan, and the captured fingerprint information or facial image information is provided to the security system for analysis. As yet another example, the sensors 350, 352 may collect video of the user and send the video data to the security system for analysis. Once the user has been identified, information specifying the user is transmitted to the mail item management application 172. In implementations where additional security is required, for example, for mail item pickup areas that store mail items of high value or that contain sensitive information, video and/or audio may be captured of all individuals entering and/or leaving the mail item pickup area.

In step 408, the mail item manager determines the location of the new mail item and provides the location to the mobile computing device. For example, the mail item management application 172 uses the user ID provided by the security system and the mail item management data 176 to identify one or more locations that store mail items available for retrieval by the user. The mail item management application 172 then provides the locations to the mobile computing device. For example, the mail item management application 172 generates and transmits one or more messages to the mail item retrieval application 150 that specify the one or more locations that store mail items that are ready to be retrieved by the user.

In step 410, the mobile computing device guides the user to the one or more locations that store the mail items for pickup by the user. This includes superimposing one or more visual cues on a live image displayed by the mobile device to guide the user to the location of the new mail item. According to an embodiment, the visual cues superimposed on the live image is presented according to "out-of-view," coarse and fine modes depending upon the orientation and distance of the mobile computing device 130 from the location of the new mail item for the user. Each of these modes is described in more detail hereinafter.

Figure 5A:
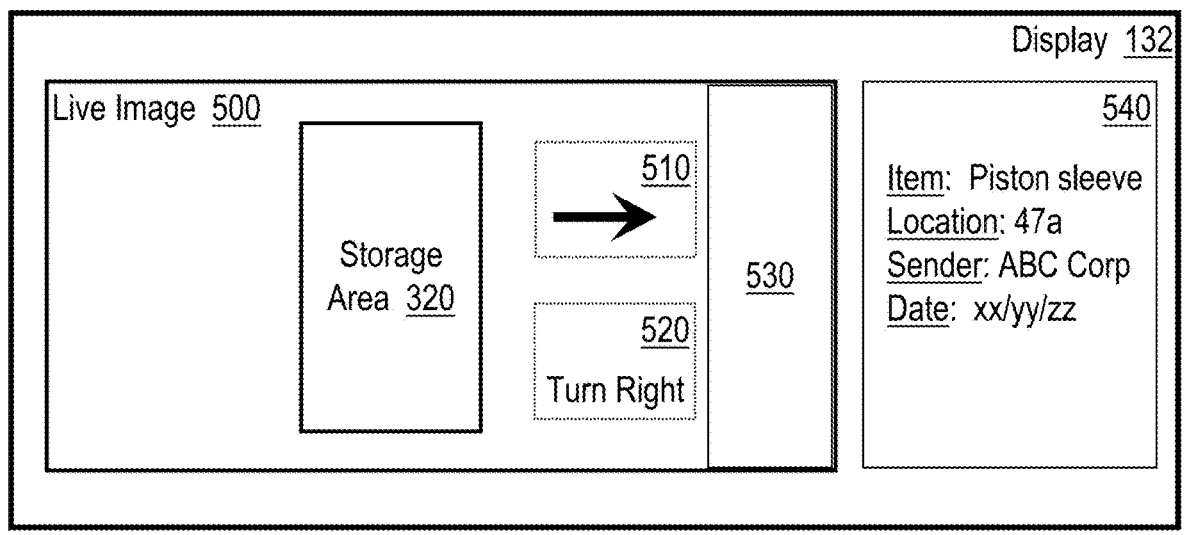
FIG. 5A is a block diagram that depicts the display of the mobile computing device with a live image displayed on the display.

FIG. 5A is a block diagram that depicts the display 132 of the mobile computing device 130 with a live image 500 displayed on the live image 500. As used herein, the term "live image" refers to an image or video data recently or currently acquired by the mobile computing device 130 and that is dynamically updated, for example as the mobile computing device 130 is moved throughout the mail item pickup area 300. Thus, the "live image" may be a stand-alone image, sometimes referred to as a "still image," multiple stand-alone images, or video data.

In the present example, it is presumed that the user is located in the entrance area 340 and facing the storage area 320. The live image 500 includes the storage area 320, but the storage areas 310, 330 are out of the field of view of the mobile computing device 130. The live image 500 may include other features of the surrounding area but these are not depicted in FIG. 5A for purposes of explanation.

The out-of-view mode is used when the location of the new mail item is not in the current field of view of the mobile computing device 130. The mail item retrieval application 150 may determine that the location of the new mail item is not within the current field of view in several ways that may vary depending upon a particular implementation. For example, using the location of the new mail item and the current location and orientation of the mobile computing device, determined via Global Positioning System (GPS) data, proximity sensors, markers identified in image data, etc., the mail item retrieval application 150 may determine that the location of the new mail item is not within the locations included in the current field of view of the mobile computing device 130.

According to the out-of-view mode, the mail item retrieval application 150 causes one or more visual cues to be superimposed on the live image 500 to visually indicate to the user a direction that the mobile computing device 130 should be oriented to bring the location of the new mail item into the current field of view of the mobile computing device 130, and more specifically, the image acquisition component 136. For example, suppose that the location of the new mail item is in the storage area 330. The mail item retrieval application 150 causes one or more visual cues to be superimposed on the live image 500 to visually indicate to the user of the mobile computing device 130 that the location of the new mail item is to the right of the current field of view of the mobile computing device 130 and that the mobile computing device 130 should be oriented to the right to bring the location of the new mail item into the current field of view of the mobile computing device 130. The visual cues may include any type of information that may vary depending upon a particular implementation and embodiments are not limited to any particular type of information. Example visual cues include, without limitation, graphical objects such as arrows, pointers, symbols and shapes, colors, shading, text, etc. Other examples are described hereinafter.

In FIG. 5A, a graphic 510 in the form of a right-pointing arrow visually indicates a direction of the location of the new mail item relative to the mobile computing device 130, i.e., that the user should turn right to find the location of their new mail item. Up and down arrows may be displayed when the location of the new mail item is above and below, respectively, the current field of view of the mobile computing device 130. The graphic 510 may be displayed with various attributes, such as size, location, color, style, shading, etc., to provide a more conspicuous visual notification to the user of the mobile computing device 130. In place of, or in addition to, the graphic 510, a text instruction 520, such as "Turn Right," may be displayed on the live image 500. Another example is a shaded area 530 disposed on the right side of the live image 500 to visually indicate to the user that their new mail item is located to the right. The shaded area 530 may be any shape and size and does not need to extend between the top and bottom of the live image 500. The shaded area 530 may be colored, for example green, and the particular shade may vary depending upon how far to the right the new mail item is located.

According to an embodiment, visual cues displayed on the display 132 are dynamically updated as the position and/or orientation of the mobile computing device 130 changes. This may include dynamically changing attributes of the visual cues, such as the graphic 510, the text instruction 520 and/or the shaded area 530 to change the visual appearance of the visual cues to provide real-time feedback to the user as the orientation and/or position of the mobile computing device 130 changes. Attributes of visual cues included, without limitation, type, size, color, shading, texture, orientation, location, and special effects. For example, an initial color or size of the graphic 510 may indicate an initial out-of-view distance, e.g., a longer arrow or a red-colored arrow visually indicates a larger out-of-view distance, while a shorter arrow, or a green-colored arrow, visually indicates a smaller out-of-view distance. Thus, the size and/or orientation of a visual cue may change as a function of the distance between the mobile computing device 130 and the location of the new mail item. As another example, the width of the shaded area 530 may dynamically decrease, or the color of the shaded area 530 may change from red to yellow, and then to green, as the out-of-view distance decreases. The type of visual cue may change as the orientation of the mobile computing device 130 changes and/or as the distance between the mobile computing device 130 and the location of the new mail item changes. For example, a first type of symbol may be initially superimposed on the live image 500 and changed to a second type of symbol as the mobile computing device 130 becomes closer to the location of the new mail item. Additional information 540 about the new mail item may be displayed on the display 132. In this example, the additional information 540 specifies the item, the location, the sender, and a date the new mail item was received. The location may include, for example, high-level location information, such as an area, aisle number, etc., and low-level information, such as a specific location. There may be situations where mail items require special handling, for example because they contain hazardous materials, medical-related contents, etc. According to an embodiment, the visual cues may indicate that the mail item requires special handling. For examples, the visual cues may include text or symbols that visually indicate that the mail item requires special handling and may indicate the contents. Also, the additional information 540 may include additional information for mail items that require special handling. In situations where multiple mail items have been stored for retrieval for the recipient, the additional information 540 may specify the number of mail items for pickup.

Once the position and/or orientation of the mobile computing device 130 has changed so that the location of the new mail item is within the current field of view of the mobile computing device 130, the mail item retrieval application 150 changes from the out-of-view mode to either the coarse mode or the fine mode, depending upon the distance from the mobile computing device 130 to the location of the new mail item. According to an embodiment, when the mail item retrieval application 150 changes from the out-of-view mode to either the coarse mode or the fine mode, the mail item retrieval application 150 changes the display 132 to visually notify the user that the location is within the current field of view of the mobile computing device 130 to alert the user to stop moving the mobile computing device 130. This reduces the likelihood that the location of the new mail item goes from out-of-view on one side of the mobile computing device 130 to out-of-view on the other side of the mobile computing device 130 if, for example, the mobile computing device is being rotated quickly. Changes in the display may include, for example, displaying objects or text on the display 132, flashing an object or border on the display 132, changing a color of a border, etc.

The coarse mode is used when the location of the new mail item is within the current field of view of the mobile computing device 130 but is further away than a coarse mode threshold. For example, for a coarse mode threshold of 20 feet, the coarse mode is used when the location of the new mail item is within the current field of view of the mobile computing device 130 but is further than 20 feet away from the mobile computing device 130. The fine mode is used when the location of the new mail item is within the current field of view of the mobile computing device 130 but is closer than the coarse mode threshold. In the prior example of a coarse mode threshold of 20 feet, the fine mode is used when the location of the new mail item is within the current field of view of the mobile computing device 130 but is closer than 20 feet away from the mobile computing device 130.

In both the coarse mode and the fine mode, one or more visual cues are superimposed on the live image 500 in a manner to visually distinguish the location of the new mail item from other locations in a storage area. According to an embodiment, the coarse and fine modes differ in the type, form, or style of visual cues that are superimposed on the live image 500. In general, in the coarse mode, the mail item retrieval application 150 superimposes one or more visual cues on the live image 500 that directs the user to the vicinity of their new mail item, but without specifically identifying their new mail item on the live image 500. In contrast, in the fine mode, the visual cues superimposed on the live image 500 specifically identifies the location of the new mail item on the live image 500.

Figure 5B:
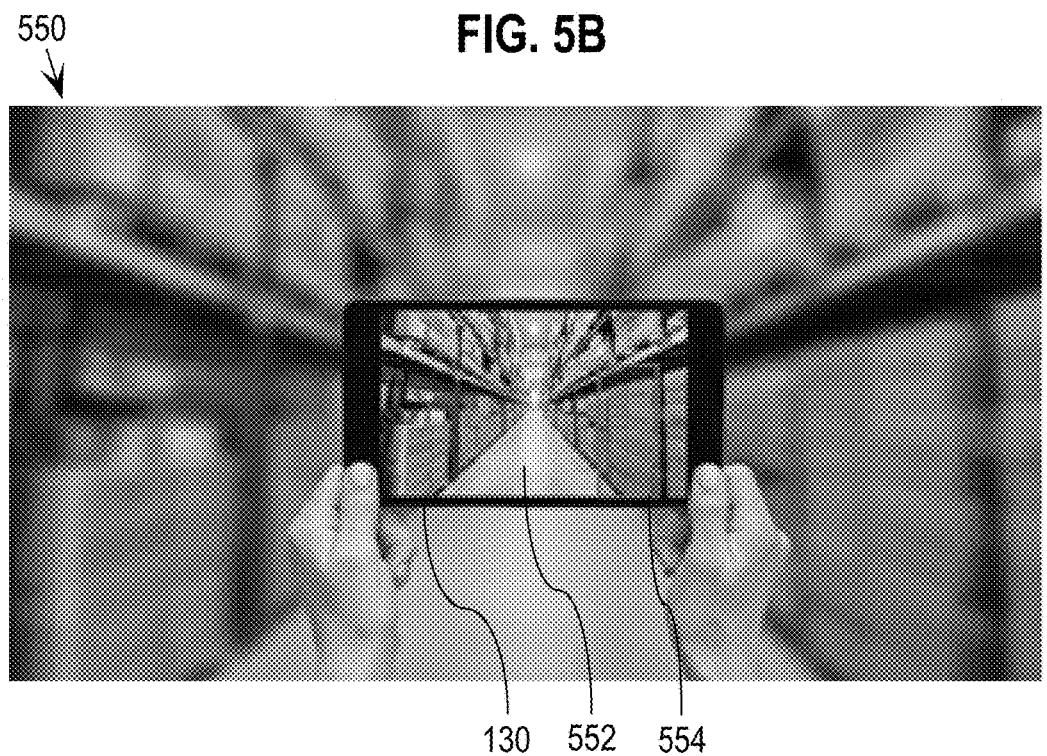
FIG. 5B depicts an example implementation of a coarse mode.

FIG. 5B depicts an example implementation of the coarse mode. In this example, a storage area 550 includes aisles of storage racks that store mail items for pickup by recipients. This example may represent a warehouse-type implementation, but embodiments are not limited to this example and are applicable, for example, to open spaces with shelving or storage racks. A user holds a mobile computing device 130 in the form of a smart phone that is configured with the mail item retrieval application 150 that displays a live image 552 of the storage area 550. The mail item retrieval application 150 superimposes a visual cue 554 on the live image 552 of the storage area 550 to direct the user to the vicinity of their new mail item. In this example, the visual cue 554 is in the form of a lightly-shaded rectangle to visually depict the location of the new mail item(s) on the live image 552, which in this example is the right side of the aisle in the field of view of the mobile computing device 130. Also, when the mail item retrieval application 150 changes from the out-of-view mode to the coarse mode, the visual cue 554 may flash or otherwise be visually depicted in a manner to attract the attention of the user to the location of the new mail item being in the current field of view of the mobile computing device 130.

The location of the new mail item in the live image 552 may be determined, for example, based upon GPS data, proximity sensors, and/or image analysis. For example, this may be done using content analysis to identify unique features of particular locations in the storage area 550, such as outline, edges, other distinguishing features, etc., within the image. Markers, such as physical and/or electronic objects, that are more easily recognized in image data, may be placed at specified locations, such as the center or a corner of a location. Once the location of the new mail item within the live image 552 is determined, the location is visually distinguished from other locations as described herein.

Figure 5C:
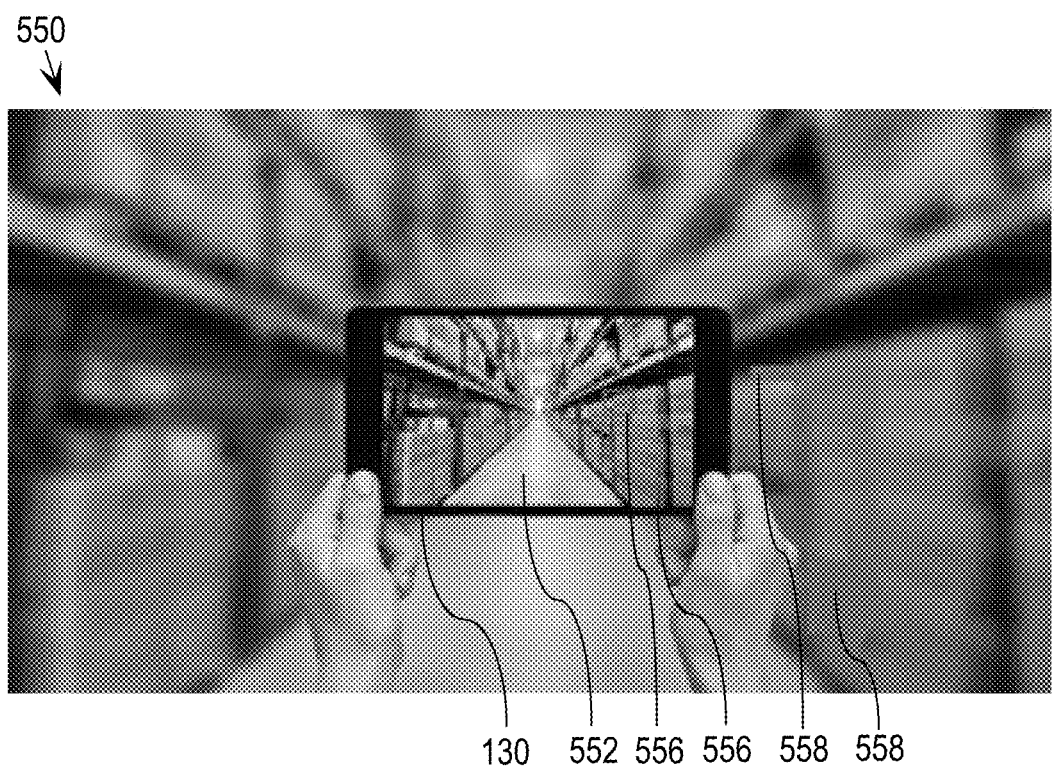
FIG. 5C depicts an example implementation of a fine mode.

FIG. 5C depicts an example implementation of the fine mode. In this example, the visual cues 556 superimposed on the live image 552 includes two separate rectangles that visually identify two new mail items and their locations in the storage area 550. In addition, other information 558, in the form of right arrows, are also superimposed on the live image 552 to visually indicate to the user that the user's new mail items are located on the right side of the aisle. The use of A/R on the mobile computing device 130 in this manner makes it easier and faster for the user to identify the correct pickup location for a new mail item, which provides a more favorable user experience and reduces the likelihood of errors, especially in large mail item pickup areas. The mail item retrieval application 150 may dynamically change between the out-of-view, coarse and fine modes as the mobile computing device 130 moves within the mail item pickup area 300 depending upon whether the location of the new mail item is within the current field of view of the mobile computing device 130 and the distance between the mobile computing device 130 and the location of the new mail item.

In step 412, the user retrieves the new mail item from the location. This may include the user scanning a code, such as a bar code, QR code, etc., on the mail item or the location. For example, each location may have a corresponding code printed on a label that is affixed to the physical location and the user uses the mobile computing device 130 to scan the code. Alternatively, the user may select a control displayed on the display 132, provide a fingerprint or facial recognition signature, sign from the mobile computing device 130, speak a command to confirm retrieval of the new mail item or other similar approaches, and the mail item retrieval application 150 transmits this information to the mail item management application 182 for tracking and accountability. As previously described herein, multiple mail items for the same recipient are grouped together so that the recipient may easily retrieve all of their mail items at the same time by performing a single action, such as scanning a code or selecting a control on the display 132 of the mobile computing device 130.

According to an embodiment, in low-security implementations such as small office environments, locations are configured with sensors, such as weight sensors, proximity sensors, etc., that provide a signal when a mail item is retrieved from the location. The signal is transmitted to the mail item management application 172 to indicate that the mail item has been retrieved. The signal includes information that specifies or indicates the corresponding location to enable the mail item management application 172 to know which mail item(s) have been retrieved. The use of sensors in this manner alleviates the need for the recipient to scan a code or select a control on the display 132 of the mobile computing device 130. For additional security to track the identity of persons who retrieve mail items, this arrangement may be augmented with video cameras to cover the areas where mail items are stored and/or the entrance/exit to the mail litem pickup area 300. In high security implementations, the recipient cannot scan the code or otherwise accept mail items of other recipients, unless authority has been delegated to the recipient as described herein. Instead, if the recipient attempts to scan a code of a mail item designated for another recipient, an error message is displayed on the display 132 of the mobile computing device 130.

In response to the user scanning a code, selecting a control on the mobile computing device 130, or speaking a command, the mail item retrieval application 150 generates and transmits a notification to the mail item management application 172 to indicate that the mail item has been retrieved and the mail item management application 172 updates its records, such as the mail item management data 176. According to an embodiment, if the recipient has delegated the pickup of the mail item to a delegee, the mail item management application 172 generates and transmits a notification to the recipient that the mail item has been retrieved by the delegee. The notification may include other information, such as a date/time that the mail item was retrieved by the delegee, etc.

In the aforementioned approach, the user was notified of a new mail item that is ready for pickup. In a situation where a user enters the mail item pickup area 400 without being notified of a new mail item, the mail item retrieval application 150 notifies the user, after consulting the mail item management application 172, that the user does not have any mail items to retrieve. The mail item retrieval application 150 may include a refresh control which, when selected by the user, causes the mail item retrieval application 150 to query the mail item management application 172 for new mail items for the user.

FIG. 6 is a flow diagram 600 that depicts an approach for retrieving a mail item using a mobile computing device and A/R from the perspective of the mail item manager 170. In step 602, the mail item manager 170 receives a notification of a new mail item. For example, after a new mail item has been received by the mail item facility 110 and processed, a notification of the new mail item is generated and transmitted to the mail item management application 172.

In step 604, the mail item management application 172 creates a new entry in the mail item management data 176. In step 606, the mail item management application 172 determines a storage location for the new mail item and records the location in the mail item management data 176. As previously described herein, the mail item management application 172 examines the mail item management data 176 to determine whether there is another mail item ready to be retrieved by the recipient and if so, uses that location for the new mail item if that location can accommodate the other mail item and the new mail item. Some locations may only be able to accommodate small mail items such as letters, while other locations may be larger and/or more open and able to store multiple mail items of different sizes, including large packages. If there are no mail items ready to be retrieved by the recipient or the location for the other mail item is not able to accommodate the new mail item, then the mail item management application 172 assigns a location that is both closest to the location for the other mail item and can accommodate the new mail item.

In step 608, a notification is generated and transmitted to the recipient. For example, the mail item management application 172 generates a notification that a new mail item is available for pickup in the mail item pickup area 300. The notification may include information about the new mail item, such as sender information, a description of the new mail item such as a name and physical attributes, such as weight, dimensions, etc., the date/time when the new mail item was received, the location of the new mail item, etc. The notification may be in the form of a message, instant message, email, etc., that the mail item management application 172 transmits to the recipient.

Sometime later after the recipient has retrieved the new mail item, in step 610 a notification is received that the mail item has been retrieved. For example, when the recipient retrieves the new mail item and either scans a code on the mail item or the location, or selects a control or speaks a command via the display 132, the mobile computing device 130 generates and transmits a notification to the mail item management application 172 that the mail item has been retrieved. The notification may conform to an API supported by the mail item management application 172.

In step 612, the mail item management data is updated. For example, the mail item management application 172 updates the entry in the mail item management data 176 to indicate that the mail item has been picked up by the recipient. This may include updating the Pickup Date/Time, Status, and Picked Up By fields in the entry in the mail item management data 176. According to an embodiment, the mail item management application 172 is configured to create and maintain a mail item log that may be used, for example, for auditing. The mail item log includes a history and chain of custody for each mail item.

Outbound mail items may be stored in a mail item drop off area for outbound mail items in the mail item facility 110 after being scanned by a user. The mail item facility 110 may include a computing system that receives the scan information for outbound mail items. The computing system contacts the mail item management application 172 to create an entry in the mail item management data 176. The entry may specify a mail item ID, a user ID of the user who dropped off the mail item, a date and/or time that the mail item was dropped off, and information about the mail item, as previously described herein.

The aforementioned approaches provide a technical solution to the problem of delivering mail items in office environments. The technical solution uses augmented reality on a mobile computing device to provide visual cues to direct users to the locations of their respective mail items. The technical solution includes dynamically updating the visual cues based upon the location and orientation of the mobile computing device, providing "out of view" assistance, and displaying information about mail items.

IV. IMPLEMENTATION EXAMPLES

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
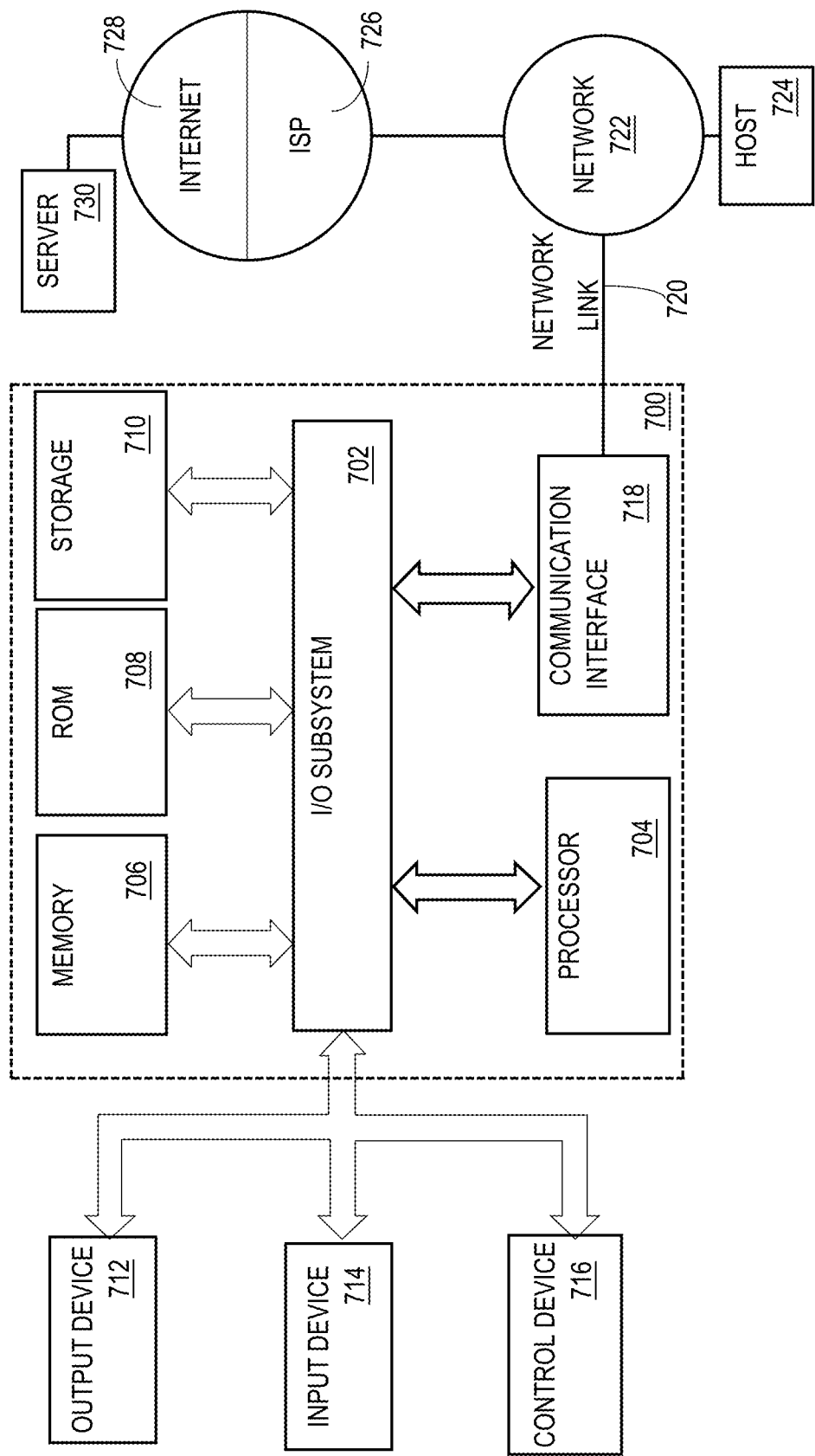
FIG. 7 is a block diagram that depicts an example computer system upon which embodiments may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. A mobile computing device comprising:
a display;
an image acquisition component; and
an application executing on the mobile computing device and configured to:
  cause data that identifies a user of the mobile computing device to be provided to a mail item manager,
  cause a location of a physical mail item stored in a physical mail item pickup area for retrieval by the user to be received from the mail item manager,
  cause the image acquisition component to acquire an image of the physical mail item pickup area,
  cause the image of the physical mail item pickup area to be displayed on the display of the mobile computing device,
  cause to be superimposed on the image of the physical mail item pickup area, one or more visual cues that direct a user of the mobile computing device to the location of the physical mail item stored in the physical mail item pickup area for retrieval by the user.

2. The mobile computing device as recited in claim 1, wherein the application executing on the mobile computing device is further configured to dynamically update the one or more visual cues superimposed on the image of the physical mail item pickup area by changing one or more attributes of the one or more visual cues to change the visual appearance of the one or more visual cues.

3. The mobile computing device as recited in claim 1, wherein the application executing on the mobile computing device is further configured to dynamically update the one or more visual cues superimposed on the image of the physical mail item pickup area in response to a change of an orientation or a position of the mobile computing device.

4. The mobile computing device as recited in claim 1, wherein:

the location of the physical mail item stored in the physical mail item pickup area for retrieval by the user is outside a current field of view of the image acquisition component, and the one or more visual cues that direct the user of the mobile computing device to the location of the physical mail item stored in the physical mail item pickup area for retrieval by the user visually indicate a direction that the mobile computing device should be oriented to bring the location of the physical mail item stored in the physical mail item pickup area for retrieval by the user into the field of view of the image acquisition component.

5. The mobile computing device as recited in claim 1, wherein:

the location of the physical mail item stored in the physical mail item pickup area for retrieval by the user is within a current field of view of the image acquisition component and is further than a threshold distance from the mobile computing device, and the one or more visual cues that direct the user of the mobile computing device to the location of the physical mail item stored in the physical mail item pickup area for retrieval by the user, direct the user of the mobile computing device to a vicinity of the location of the physical mail item stored in the physical mail pickup area for retrieval by the user.

6. The mobile computing device as recited in claim 1, wherein:

the location of the physical mail item stored in the physical mail item pickup area for retrieval by the user is within a current field of view of the image acquisition component and is less than a threshold distance from the mobile computing device, and the one or more visual cues that direct the user of the mobile computing device to the location of the physical mail item stored in the physical mail item pickup area for retrieval by the user visually identify the physical mail item on the image of the physical item pickup area.

7. The mobile computing device as recited in claim 1, wherein the one or more visual cues superimposed on the image of the physical mail item pickup area include one or more of one or more objects, one or more symbols, one or more shapes, one or more shaded areas, or text.

8. The mobile computing device as recited in claim 1, wherein the image of the physical mail item pickup area is a video image.

9. A computer-implemented method comprising:

an application executing on a mobile computing device:
  causing data that identifies a user of the mobile computing device to be provided to a mail item manager,
  causing a location of a physical mail item stored in a physical mail item pickup area for retrieval by the user to be received from the mail item manager,
  causing an image acquisition component on the mobile computing device to acquire an image of the physical mail item pickup area,
  causing the image of the physical mail item pickup area to be displayed on a display of the mobile computing device,
  causing to be superimposed on the image of the physical mail item pickup area, one or more visual cues that direct the user of the mobile computing device to the location of the physical mail item stored in the physical mail item pickup area for retrieval by the user.

10. The computer-implemented method as recited in claim 9, further comprising the application executing on the mobile computing device dynamically updating the one or more visual cues superimposed on the image of the physical mail item pickup area by changing one or more attributes of the one or more visual cues to change the visual appearance of the one or more visual cues.

11. The computer-implemented method as recited in claim 9, further comprising the application executing on the mobile computing device dynamically updating the one or more visual cues superimposed on the image of the physical mail item pickup area in response to a change of an orientation or a position of the mobile computing device.

12. The computer-implemented method as recited in claim 9, wherein:

the location of the physical mail item stored in the physical mail item pickup area for retrieval by the user is outside a current field of view of the image acquisition component, and the one or more visual cues that direct the user of the mobile computing device to the location of the physical mail item stored in the physical mail item pickup area for retrieval by the user visually indicate a direction that the mobile computing device should be oriented to bring the location of the physical mail item stored in the physical mail item pickup area for retrieval by the user into the field of view of the image acquisition component.

13. The computer-implemented method as recited in claim 9, wherein:

the location of the physical mail item stored in the physical mail item pickup area for retrieval by the user is within a current field of view of the image acquisition component and is further than a threshold distance from the mobile computing device, and the one or more visual cues that direct the user of the mobile computing device to the location of the physical mail item stored in the physical mail item pickup area for retrieval by the user, direct the user of the mobile computing device to a vicinity of the location of the physical mail item stored in the physical mail pickup area for retrieval by the user.

14. The computer-implemented method as recited in claim 9, wherein:

the location of the physical mail item stored in the physical mail item pickup area for retrieval by the user is within a current field of view of the image acquisition component and is less than a threshold distance from the mobile computing device, and the one or more visual cues that direct the user of the mobile computing device to the location of the physical mail item stored in the physical mail item pickup area for retrieval by the user visually identify the physical mail item on the image of the physical item pickup area.

15. The computer-implemented method as recited in claim 9, wherein the one or more visual cues superimposed on the image of the physical mail item pickup area include one or more of one or more objects, one or more symbols, one or more shapes, one or more shaded areas, or text.

16. The computer-implemented method as recited in claim 9, wherein the image of the physical mail item pickup area is a video image.

17. One or more non-transitory computer-readable media storing instructions which, when processed by one or more processors, cause an application executing on a mobile computing device to:

cause data that identifies a user of the mobile computing device to be provided to a mail item manager, cause a location of a physical mail item stored in a physical mail item pickup area for retrieval by the user to be received from the mail item manager, cause an image acquisition component on the mobile computing device to acquire an image of the physical mail item pickup area, cause the image of the physical mail item pickup area to be displayed on a display of the mobile computing device, cause to be superimposed on the image of the physical mail item pickup area, one or more visual cues that direct the user of the mobile computing device to the location of the physical mail item stored in the physical mail item pickup area for retrieval by the user.

18. The one or more non-transitory computer-readable media as recited in claim 17, wherein the processing of the instructions by the one or more processors further causes the application executing on the mobile computing device to dynamically update the one or more visual cues superimposed on the image of the physical mail item pickup area by changing one or more attributes of the one or more visual cues to change the visual appearance of the one or more visual cues.

19. The one or more non-transitory computer-readable media as recited in claim 17, wherein:

the location of the physical mail item stored in the physical mail item pickup area for retrieval by the user is within a current field of view of the image acquisition component and is further than a threshold distance from the mobile computing device, and the one or more visual cues that direct the user of the mobile computing device to the location of the physical mail item stored in the physical mail item pickup area for retrieval by the user, direct the user of the mobile computing device to a vicinity of the location of the physical mail item stored in the physical mail pickup area for retrieval by the user.

20. The one or more non-transitory computer-readable media as recited in claim 17, wherein:

the location of the physical mail item stored in the physical mail item pickup area for retrieval by the user is within a current field of view of the image acquisition component and is less than a threshold distance from the mobile computing device, and the one or more visual cues that direct the user of the mobile computing device to the location of the physical mail item stored in the physical mail item pickup area for retrieval by the user visually identify the physical mail item on the image of the physical item pickup area.

* * * * *